(12) United States Patent
Masel et al.

(10) Patent No.: US 11,511,259 B1
(45) Date of Patent: Nov. 29, 2022

(54) CARBON DIOXIDE CAPTURE SYSTEM

(71) Applicant: Dioxide Materials, Inc., Boca Raton, FL (US)

(72) Inventors: Richard I. Masel, Boca Raton, FL (US); Hongzhou Yang, Boca Raton, FL (US)

(73) Assignee: Dioxide Materials, Inc., Boca Raton, FL (US)

( * ) Notice: Subject to any disclaimer, the term of this patent is extended or adjusted under 35 U.S.C. 154(b) by 0 days.

(21) Appl. No.: 17/391,688

(22) Filed: Aug. 2, 2021

(51) Int. Cl.
*B01J 20/28* (2006.01)
*B01J 20/04* (2006.01)
*B01J 20/20* (2006.01)
*B01D 53/14* (2006.01)
*B01D 53/18* (2006.01)

(52) U.S. Cl.
CPC .......... *B01J 20/20* (2013.01); *B01D 53/1425* (2013.01); *B01D 53/1475* (2013.01); *B01D 53/1493* (2013.01); *B01D 53/18* (2013.01); *B01J 20/045* (2013.01); *B01J 20/28021* (2013.01); *B01J 20/28085* (2013.01); *B01D 2252/20405* (2013.01); *B01D 2252/20431* (2013.01); *B01D 2252/20484* (2013.01); *B01J 2220/46* (2013.01)

(58) Field of Classification Search
None
See application file for complete search history.

(56) References Cited

U.S. PATENT DOCUMENTS

| 4,472,358 A * | 9/1984 | Khudenko | ................. B01J 8/34 96/299 |
| 2011/0293498 A1* | 12/2011 | Lahary | .................. B01D 53/82 423/437.1 |

OTHER PUBLICATIONS

National Energy Technology Laboratory, Compendium of Carbon Capture Technology, May 2020.
Wikipedia, Boiling Chip (https://en.wikipedia.org/wiki/Boiling_chip; accessed on Oct. 20, 2021).
National Energy Technology Laboratory, Compendium of Carbon Capture Technology, pp. 216-281, May 2020.

* cited by examiner

Primary Examiner — Daniel Berns
(74) Attorney, Agent, or Firm — Cook Alex Ltd.

(57) ABSTRACT

The present system reduces the cost of carbon capture by reducing the over-temperature needed to strip $CO_2$ from a liquid or fluid solution. The system includes structures that enhance the rate of $CO_2$ bubble nucleation.

19 Claims, 6 Drawing Sheets

CARBON DIOXIDE CAPTURE SYSTEM

FIELD OF THE INVENTION

The field of the invention is carbon dioxide capture systems and methods. In particular, the present application is directed to a system and method for reducing the cost of carbon capture by reducing the over-temperature needed to strip $CO_2$ from a liquid or fluid solution.

BACKGROUND OF THE INVENTION

At present, there is a desire to decrease carbon dioxide ($CO_2$) emissions from industrial facilities as a way of mitigating climate change. In May 2020, National Energy Technology Laboratory (NETL) published a report entitled "Compendium Of Carbon Capture Technology" ("the NETL report") that summarizes the available technology. Presently, most commercial $CO_2$ capture systems first absorb the $CO_2$ into an absorbent such as an amine solution or alkaline solid. Then steam or another heat source is used to strip (namely, desorb) the $CO_2$ from the adsorbent.

Presently, the cost of the heat or steam is a major expense for the process, so there is a desire to reduce the amount of costly heat or steam needed for the process.

Experimentally, one often needs to provide more heat to the process than would be needed at equilibrium. Most stripping processes operate at a higher temperature than is needed based on equilibrium. For example, the boiler in a stripping unit used to remove $CO_2$ from a solution containing a 3M N,N-diethylethanolamine (DEEA)/2M N-methyl-1,3-propane-diamine (MAPA) might operate at 115-125° C. even though the equilibrium temperature needed to remove enough $CO_2$ is only 80° C. The excess temperature is called "over-temperature" and represents wasted energy. The use of higher temperatures also results in greater evaporation of water and amines, further increasing the heat needed to perform $CO_2$ stripping. The higher temperatures also limit the use of available waste heat sources to only those where the waste heat is at a high enough temperature to be used.

In the past, most investigators have assumed that the rate of $CO_2$ stripping is limited by the rate of various chemical reactions such as:

$$H_2CO_3 \rightarrow CO_2 + H_2O$$

That has led to a concerted effort to find mixtures of amines that have improved kinetics as described in the NETL report. Catalysts have also been tried. However, significant over-temperatures are still required.

SUMMARY OF THE INVENTION

The present system reduces the over-temperature needed to capture and concentrate $CO_2$. The present system comprises structures that enhance the nucleation of $CO_2$ bubbles. Specifically, the system comprises:
 a capture unit capable of adsorbing or absorbing $CO_2$ into a fluid stream;
 a stripping unit capable of removing $CO_2$ from the fluid stream; wherein the system comprises at least one of the following:
  (a) solid particles within the fluid stream comprising at least one of:
   (i) pores with a diameter between 0.1 and 100 microns;
   (ii) crevices with a minimum opening width between 0.1 and 100 microns;
   (iii) cracks with a minimum opening between 0.1 and 100 microns;
  (b) solid particles within the stripping unit comprising at least one of:
   (i) pores with a diameter between 0.1 and 100 microns;
   (ii) crevices with a minimum opening width between 0.1 and 100 microns;
   (iii) cracks with a minimum opening between 0.1 and 100 microns;
  (c) solid surfaces within the stripping unit comprising at least one of:
   (i) pores with a diameter between 0.1 and 100 microns;
   (ii) crevices with a minimum opening width between 0.1 and 100 microns;
   (iii) cracks with a minimum opening between 0.1 and 100 microns;
   (iv) islands of hydrophobic materials with a diameter between 0.1 and 100 microns.

Preferably the pores are between 1 and 20 microns, most preferably the pores are between 2 and 10 microns.

Preferably, at least one of the pores, cracks or crevices is hydrophobic.

Preferably, the particles comprise one or more of alumina, silicon carbide, calcium carbonate, calcium sulfate, porcelain and carbon, more preferably porous carbon or calcium sulfate.

Preferably, the particles comprise a hydrophobic polymer. The hydrophobic polymer is preferably at least one of polyethylene, polypropylene, polystyrene, polyvinylchloride, polydimethylsiloxane, polyvinylpyridine, polybutadiene, polyisoprene, polyvinylidenefluoride, and polytetrafluoroethylene (PTFE). The hydrophobic polymer is most preferably PTFE.

Preferably, the islands comprise at least one of polyethylene, polypropylene, polystyrene, polyvinylchloride, polydimethylsiloxane, polyvinylpyridine, polybutadiene, polyisoprene, polyvinylidenefluoride, and PTFE.

Preferably, the fluid stream comprises one or more amine. Formulations comprising a tertiary amine are preferred, as are formulations that include at least one of piperazine (PZ), N-methyl-1,3-propane-diamine (MAPA), monoethanolamine (MEA), and diethanolamine (DEA).

Preferably, the tertiary amine comprises at least one of N-methyldiethanolamine (MDEA), 2-(dimethylamino)ethanol (DMAE), N-tert-butyldiethanolamine (tBDEA), 3-dimethylamino-1-propanol (DMA-1P), 3-(dimethylamino)-1,2-propanediol (DMA-1,2-PD), 2-diethylethanoamine (DEEA), 3-diethylamino-1,2-propanediol (DEA-1,2-PD), 3-diethylamino-1-propanol (DEA-1P), triethanolamine (TEA), 1-dimethylamino-2-propanol (DMA-2P), 1-(2-hydroxyethyl)pyrrolidine (1-(2HE)PRLD), 1-diethylamino-2-propanol (DEA-2P), 3-pyrrolidino-1,2-propanediol (PRLD-1,2-PD), 2-(diisopropylamino)ethanol (DIPAE), 1-(2-hydroxyethyl)piperidine (1-(2HE)PP), 2-(dimethylamino)-2-methyl-1-propanol (DMA-2M-1P), 3-piperidino-1,2-propanediol (3PP-1,2-PD), 3-dimethylamino-2,2-dimethyl-1-propanol (DMA-2,2-DM-1P), 3-hydroxy-1-methylpiperidine (3H-1MPP), N-ethyldiethanolamine (EDEA), 1-ethyl-3-hydroxypiperidine (1E-3HPP), 4-ethylmethyl-amino-2-butanol (4EMA-2B), N-isopropyldiethanolamine (IPDEA), and 1-methyl-2-piperidineethanol (1M-2PPE), most preferably DEEA.

Preferably, the fluid stream is a liquid.

DETAILED DESCRIPTION OF ILLUSTRATIVE EMBODIMENTS(S)

Figure 1:
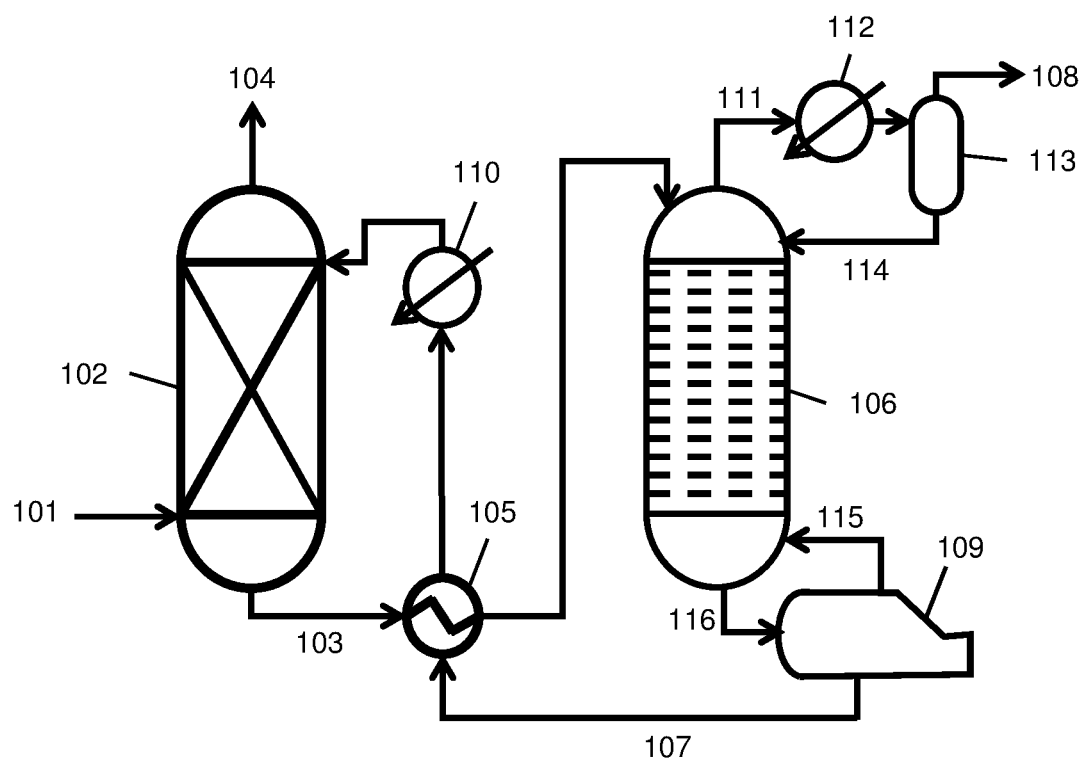
FIG. 1 is a schematic diagram of a conventional amine-based $CO_2$ scrubbing system.

The invention disclosed herein is not limited to the particular methodology, protocols, and reagents described herein, as these can vary as persons familiar with the technology involved here will recognize. The terminology employed herein is used for the purpose of describing particular embodiments only, and is not intended to limit the scope of the invention. As used herein and in the appended claims, the singular forms "a," "an," and "the" include the plural reference unless the context clearly dictates otherwise. Thus, for example, a reference to "a linker" is a reference to one or more linkers and equivalents thereof known to persons familiar with the technology involved here.

Unless defined otherwise, all technical and scientific terms used herein have the same meanings as commonly understood by persons familiar with the technology involved here. The embodiments of the invention and the various features and advantageous details thereof are explained more fully with reference to the non-limiting embodiments and/or illustrated in the accompanying drawings and detailed in the following description, where the term "and/or" signifies either one or both of the options. It should be noted that the features illustrated in the drawings are not necessarily drawn to scale, and features of one embodiment can be employed with other embodiments as persons familiar with the technology involved here would recognize, even if not explicitly stated herein.

Any numerical value ranges recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32, and so on, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the invention are defined specifically. Particular methods, devices, and materials are described, although any methods and materials similar or equivalent to those described herein can be used in the practice or testing of the invention. All references referred to herein are incorporated by reference herein in their entirety.

Definitions

The term "$CO_2$ adsorbent" refers to a substance that adsorbs $CO_2$ and releases the $CO_2$ upon heating. Examples of $CO_2$ adsorbents include amines and solids comprising amines, metal organic frameworks (MOFs), zeolites, and metal oxides.

The term "cyclic amine" refers to a molecule containing a cyclic amine. This specifically includes imidazoles, pyridines, pyrazoles, pyrrolides, pyrroles, pyrimides, piperidines, indoles, and triazines, The term "tertiary amine" refers to any amine of the form:

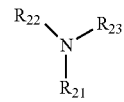

where $R_{21}$-$R_{23}$ are each independently selected from linear alkyls, branched alkyls, cyclic alkyls, heteroalkyls, aryls, cyclic aryls, heteroaryls, alkylaryls, heteroalkylaryls. Cyclic amines where at least one nitrogen in the amine is not bonded to hydrogen are specifically included.

Examples of tertiary amines include: N-methyldiethanolamine (MDEA), 2-(dimethylamino)ethanol (DMAE), N-tert-butyldiethanolamine (tBDEA), 3-dimethylamino-1-propanol (DMA-1P), 3-(dimethylamino)-1,2-propanediol (DMA-1,2-PD), 2-diethylethanoamine (DEEA), 3-diethylamino-1,2-propanediol (DEA-1,2-PD), 3-diethylamino-1-propanol (DEA-1P), triethanolamine (TEA), 1-dimethylamino-2-propanol (DMA-2P), 1-(2-hydroxyethyl)pyrrolidine (1-(2HE)PRLD), 1-diethylamino-2-propanol (DEA-2P), 3-pyrrolidino-1,2-propanediol (PRLD-1,2-PD), 2-(diisopropylamino)ethanol (DIPAE), 1-(2-hydroxyethyl)piperidine (1-(2HE)PP), 2-(dimethylamino)-2-methyl-1-propanol (DMA-2M-1P), 3-piperidino-1,2-propanediol (3PP-1,2-PD), 3-dimethylamino-2,2-dimethyl-1-propanol (DMA-2,2-DM-1P), 3-hydroxy-1-methylpiperidine (3H-1MPP), N-ethyldiethanolamine (EDEA), 1-ethyl-3-hydroxypiperidine (1E-3HPP), 4-ethyl-methyl-amino-2-butanol (4EMA-2B), N-isopropyldiethanolamine (IPDEA), and 1-methyl-2-piperidineethanol (1M-2PPE)

The term "absorption promotor" refers to a molecule that speeds the adsorption or absorption of $CO_2$ into a liquid or fluid solution. Examples of adsorption promotors include piperazine (PZ), N-methyl-1,3-propane-diamine (MAPA), a carbonic anhydrase, zinc imidazole compounds, and arsenite.

The term "electrochemical conversion of $CO_2$" refers to any electrochemical process where carbon dioxide, carbonate, or bicarbonate is converted into another chemical substance in any step of the process.

Specific Description

FIG. 1 is a schematic diagram of a conventional $CO_2$ capture process using amines. Generally, $CO_2$ capture is a two-step process. Generally an inlet waste stream 101 containing $CO_2$ is fed into an adsorption column 102. The $CO_2$ reacts with an amine solution in adsorption column 102 to form an amine rich solution 103 and an outlet gas stream 104 with a low $CO_2$ content. Amine rich solution 103 flows through a heat exchanger 105 and into a stripping column 106 to produce a lean amine solution 116 and a $CO_2$ rich solution 111. $CO_2$ rich solution 111 flows through a condenser 112 and into a gas/liquid separator 113 to produce a substantially pure $CO_2$ outlet stream 108 and a condensate stream 114, which is fed back into stripping column 106. Lean amine solution 116 is fed into a reboiler 109 to produce a heated lean amine solution 107 and heated stream 115 comprising an amine solution, water vapor, vaporized amine and $CO_2$. Heated stream 115 is fed back into stripping column 106. Lean amine solution 107 is then passed through heat exchanger 105, cooled by condenser 110, and fed back into adsorption column 102.

Reboiler 109 lowers the amount of dissolved $CO_2$ in lean amine solution 116. Reboiler 109 typically operates between 115° C. and 125° C. By comparison, if equilibrium could be obtained in stripping column 106, and one used a tertiary amine adsorption material such as DEEA, one would only need to heat lean amine solution 116 exiting at the bottom of stripping column 106 to about 80° C.

Comparative Example 1: $CO_2$ Stripping from a Conventional Amine

The objective of this example is to provide a baseline for $CO_2$ stripping in a low temperature boiler. In particular, $CO_2$ will be adsorbed into a 5 M DEEA solution, and then heated to 60° C., and the amount of $CO_2$ remaining in the solution will be monitored as a function of time.

Step 1: Creation of a $CO_2$ saturated 5 M Diethylethanolamine (DEEA) solution. 146.5 grams of DEEA (Sigma Aldrich, St. Louis, Mo.) was mixed with 85 grams of water to form 250 ml of a 5 M DEEA solution. The solution was mounted on a magnetic stirrer and $CO_2$ (NuCO$_2$, St. Lucia, Fla.) was bubbled through the solution for 24 hours at a rate of 30 ml/min.

Step 2. 200 mL of the $CO_2$ saturated 5 M DEEA solution was placed in a 250 ml three-neck flask. A heating mantle was then used to raise the temperature of the flask. The temperature of the solution was monitored as a function of time. Periodically, a 1 ml sample of the solution was withdrawn from the solution, and the amount of $CO_2$ remaining in the solution was determined by adding 1.2 mL of concentrated HCl (Lab Chem), and measuring how much $CO_2$ was released using a burette.

Figure 2:
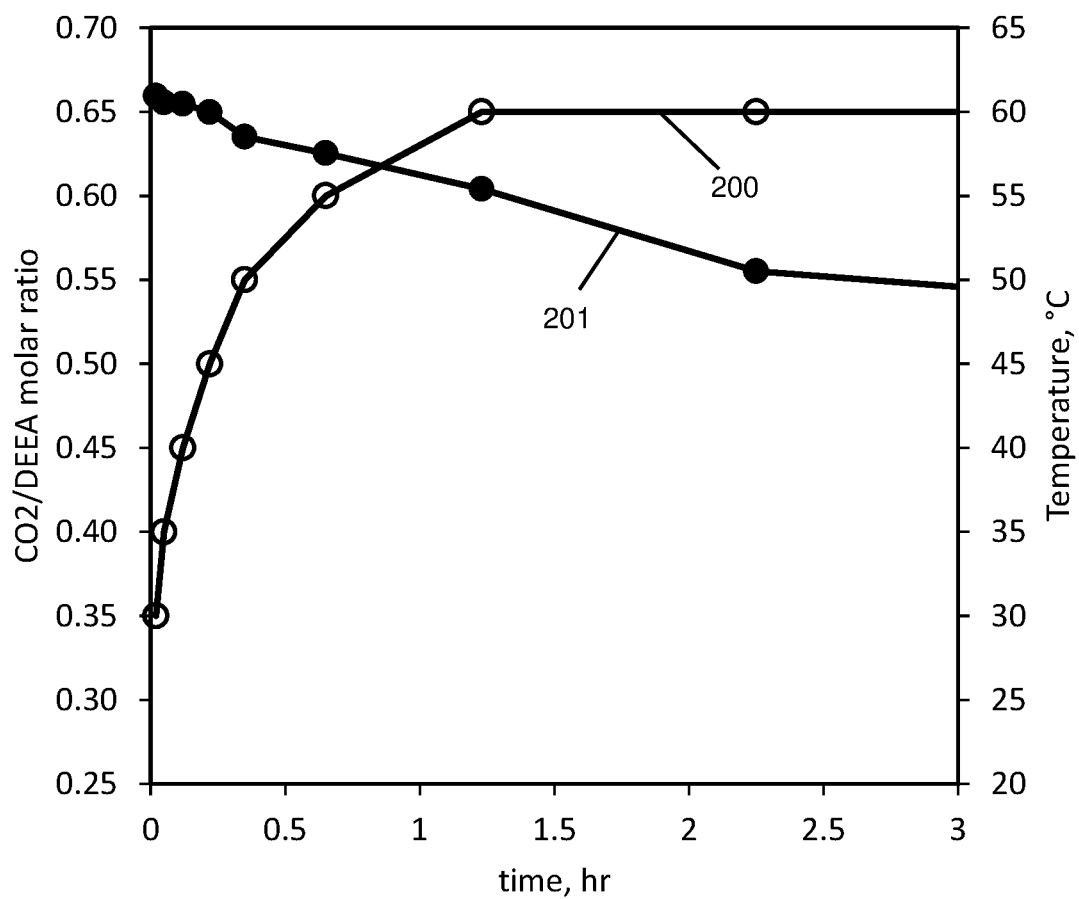
FIG. 2 is a composite plot showing how the temperature of the DEEA solution (plot 200) and the amount of $CO_2$ adsorbed into the DEEA as measured by the molar ratio of the $CO_2$ and DEEA in solution (plot 201) varied with time for the first three hours in the experiments in Comparative Example 1.

FIG. 2 shows how the temperature (plot 200) and the ratio of the $CO_2$ concentration to the DEEA concentration (plot 201) varied with time during the first three hours of the experiment. The solution took 1.25 hours to heat up to 60° C. The $CO_2$ concentration slowly dropped over with time but the molar ratio was still above 0.5 after 3 hours.

Figure 3:
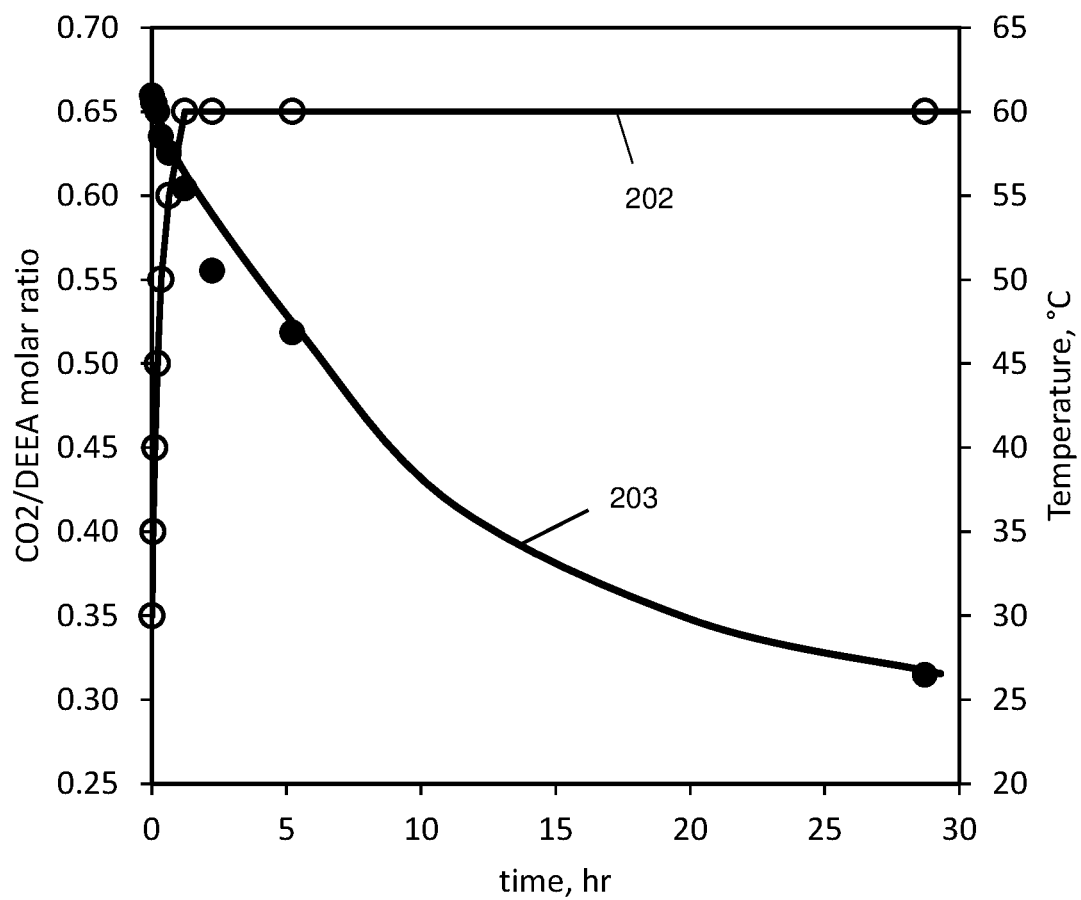
FIG. 3 is a composite plot showing how the temperature of the DEEA solution (plot 202) and the amount of $CO_2$ adsorbed into the DEEA as measured by the molar ratio of the $CO_2$ and DEEA in solution (plot 203) varied with time for the first 28 hours in experiments in Comparative Example 1.

FIG. 3 shows how the temperature (plot 202) and the ratio of the $CO_2$ concentration to the DEEA concentration (plot 203) varied with time during the first thirty hours of the experiment. After 29 hours, the $CO_2$ to DEEA ratio was still above 0.3.

Specific Example 1: The Effect of $CaSO_4$ Additions

The objective of this example is to consider the effect of the additions of calcium sulfate powder to the solution above.

The procedure was the same as in Comparison Example 1, except 5 grams of $CaSO_4$ powder (Sigma Aldrich) was added to the flask before the amine was added.

Figure 4:
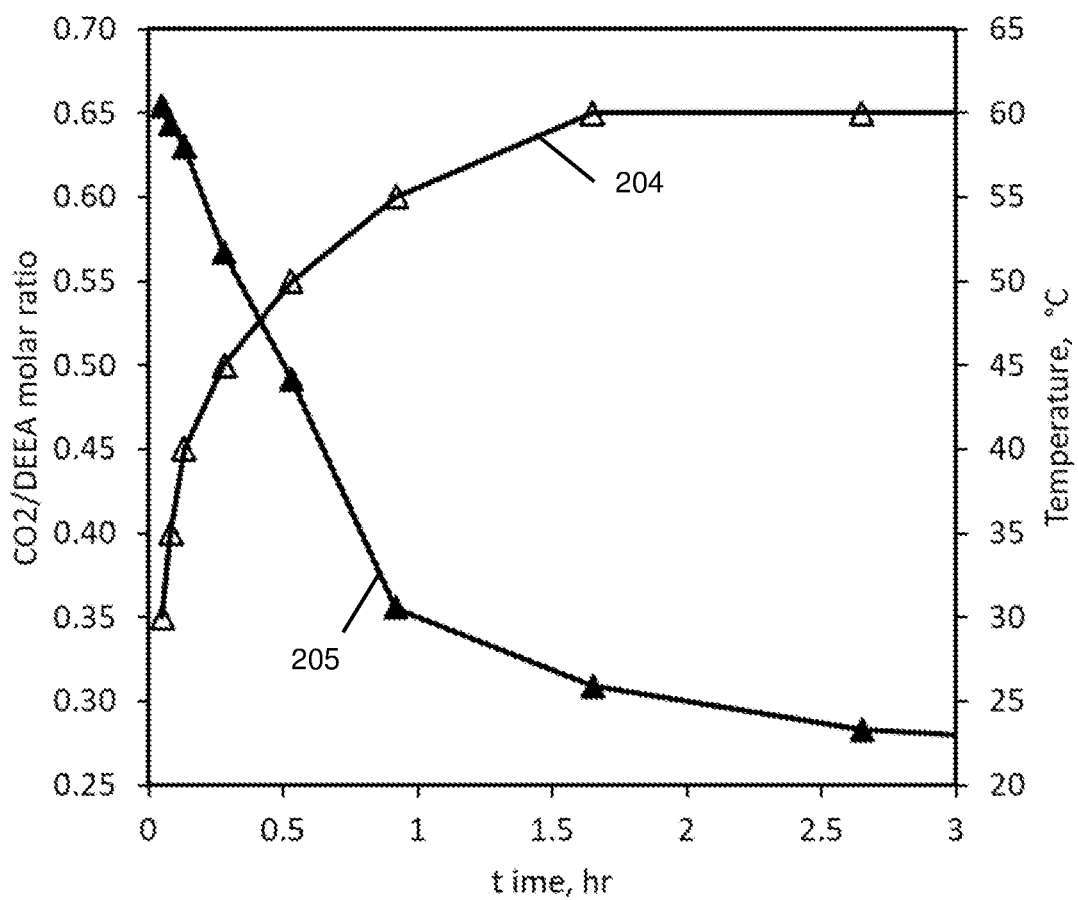
FIG. 4 is a composite plot showing how the temperature of the DEEA solution (plot 204) and the amount of $CO_2$ adsorbed into the DEEA as measured by the molar ratio of the $CO_2$ and DEEA in solution (plot 205) varied with time for the experiments in Specific Example 1.

FIG. 4 shows how the temperature (plot 204) and the ratio of the $CO_2$ concentration to the DEEA concentration (plot 205) varied with time during the experiment. The solution took 1.50 hours to heat up to 60° C. In comparison to the results in FIG. 2, the $CO_2$ concentration started to drop rapidly even before the solution reached 60° C. The $CO_2$ to DEEA ratio was below 0.3 within about one-half hour after the solution reached 60° C. At the 2.5 hour point (namely, 1 hour after the solution reached 60° C.) the $CO_2$/DEEA ratio was essentially at equilibrium.

This example demonstrates that the rate of $CO_2$ stripping can be increased by about 1 order of magnitude by adding calcium sulfate powder to the stripping unit.

Specific Example 2: The effect of Microporous Carbon Boiling Chips

This example considers the use of microporous carbon boiling chips to raise the rate of $CO_2$ stripping from an amine solution. The procedure was the same as in Specific Example 1 except that 5 grams of microporous carbon boiling chips (Sigma Aldrich) were added in place of the $CaSO_4$.

Figure 5:
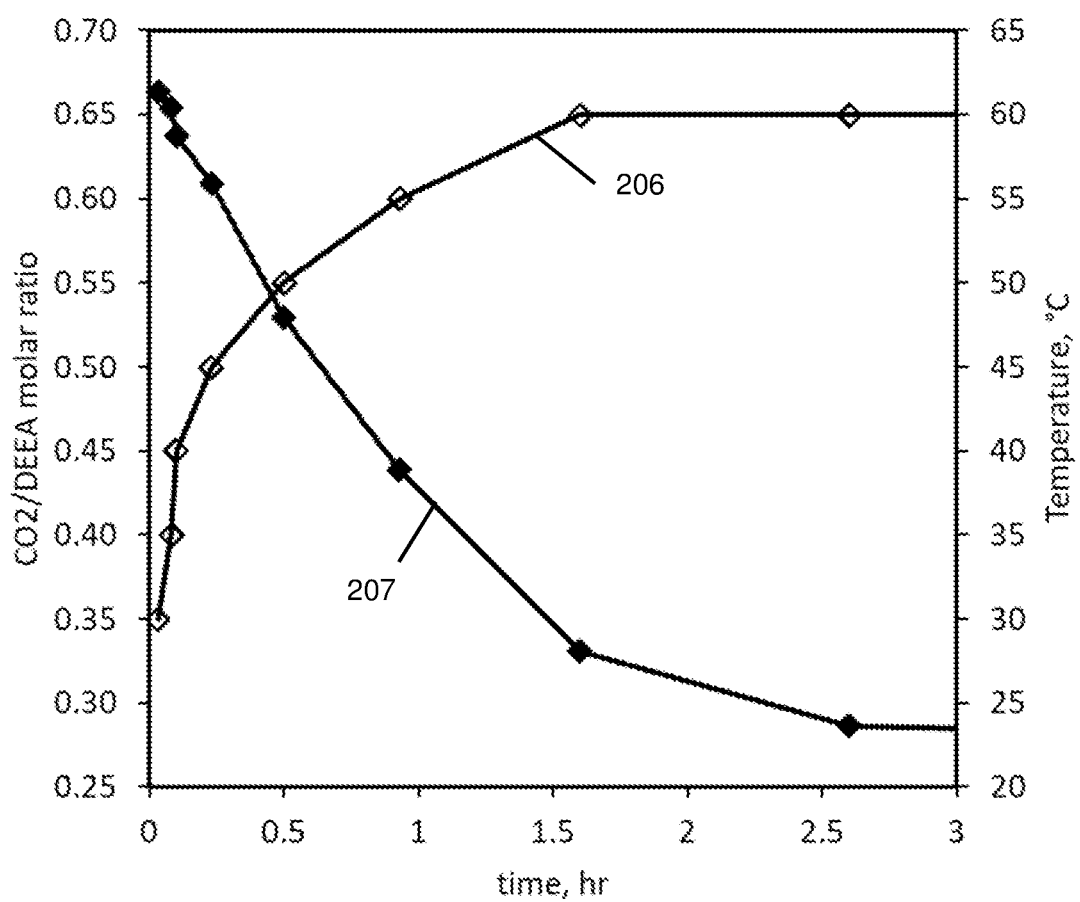
FIG. 5 is a composite plot showing how the temperature of the DEEA solution (plot 206) and the amount of $CO_2$ adsorbed into the DEEA as measured by the molar ratio of the $CO_2$ and DEEA in solution (plot 207) varied with time for the experiments in Specific Example 2.

FIG. 5 shows how the temperature (plot 206) and the ratio of the $CO_2$ concentration to the DEEA concentration (plot 207) varied with time during the experiment. The solution took 1.5 hours to heat up to 60° C. In comparison to the results in FIG. 2, the $CO_2$ started to drop rapidly even before the solution reached 60° C. The $CO_2$ to DEEA ratio was below 0.3 within about one-half hour after the solution reached 60° C. At the 2.5 hour point (namely, 1 hour after the solution reached 60° C.) the $CO_2$/DEEA ratio was essentially at equilibrium.

Figure 6:
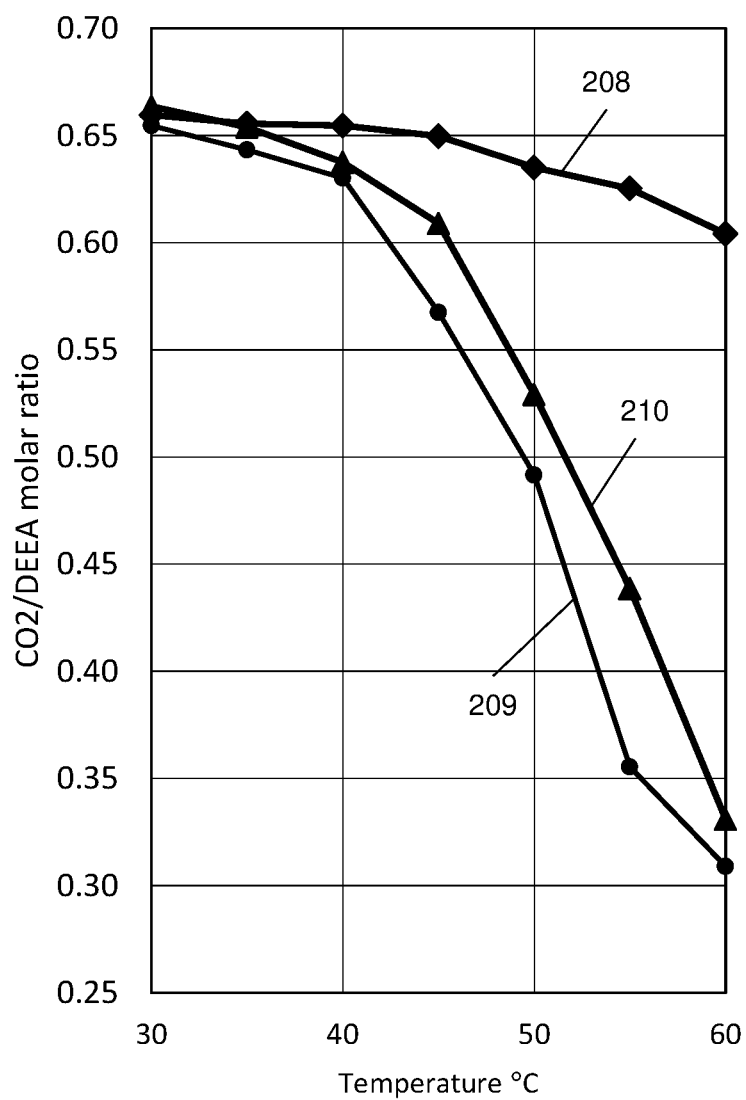
FIG. 6 is a composite plot showing the variation of the molar ratio of $CO_2$ and DEEA in solution as a function of temperature measured during the first 1.5 hours during the run in Comparative Example 1 (plot 208), Specific Example 1 (plot 209) and Specific Example 2 (plot 210).

FIG. 6 compares the cases more carefully. FIG. 6 is a plot of the $CO_2$ to DEEA ratio as a function of temperature during the first 1.5 hours of operation. Plot 208 is data from Comparative Example 1, plot 209 is data from Specific Example 1, and plot 210 is data from Specific Example 2. Notice that the $CaSO_4$ powder in Specific Example 1 had the largest effect on the stripping rate, namely, the rate that $CO_2$ was removed from the solution. The microporous carbon in Specific Example 2 had a smaller but significant stripping rate. In both cases, the rate of $CO_2$ removal was over an order of magnitude higher than the case in Comparative Example 1.

At this point the mechanism that leads to the enhancement in the stripping rate is not completely clear, but it is postulated that the $CaSO_4$ powder and the microporous carbon boiling chips enhance the rate of $CO_2$ nucleation in solution.

During $CO_2$ stripping, a $CO_2$ bubble needs to nucleate before the bubble can grow. The nucleation rate is determined by a balance between the thermodynamic driving force ($\Delta G$) for $CO_2$ release from the solution and the surface tension of the fluid. Surface tension forces are huge when the bubble starts to grow, so in the absence of additives, the solution needs to be superheated to overcome the surface tension.

But that changes in the presence of $CaSO_4$ powder. Calcium sulfate is almost insoluble in the amine solution and somewhat hydrophobic. The surface of the powder is rough, with crevices with a minimum dimension between 0.1 and 100 microns. The crevices start out filled with air. The energy needed to grow a bubble starting with a small air pocket is much lower than the energy needed to nucleate the bubble without a nucleation aid. Therefore, it is reasonable to assert that cracks and cavities in the $CaSO_4$ powder act as nucleation sites to enhance the rate of $CO_2$ stripping from the solution.

The experimental data using microporous carbon boiling chips seems to verify this hypothesis. Microporous carbon boiling chips have pores in the range of 0.1 to 100 microns, and cracks with an opening between 0.1 and 100 microns. It is postulated that the cracks and pores can act as nucleation sites for $CO_2$ removal from a liquid or fluid solution.

The invention is not limited to $CaSO_4$ and microporous carbon based boiling chips. The Wikipedia section on boiling chips (https://en.wikipedia.org/wiki/Boiling_chip) notes "porous material, such as alumina, silicon carbide, calcium carbonate, calcium sulfate, porcelain or carbon, and often have a nonreactive coating of PTFE . . . . In less demanding situations, like school laboratories, pieces of broken porcelainware or glassware are often used."

An important feature of all of these structures is that they contain pores, crevices or cracks with openings that are between 0.1 and 100 microns in diameter. The pores or crevices are preferably hydrophobic. Pores smaller than about 0.1 microns would not lead to sufficient reduction in the surface tension. Pores larger than 100 microns would have issues with bubble detachment and flooding.

In many cases the pores are coated with hydrophobic polymers. PTFE is most common, but other hydrophobic polymers including polyethylene, polypropylene, polystyrene, polyvinylchloride, polydimethylsiloxane, polyvinylpyridine, polybutadiene, polyisoprene, and polyvinylidenefluoride would also be effective coatings.

In Specific Examples 1 and 2, powders were added to an amine solution to enhance $CO_2$ stripping, but the pores could instead be in the walls of the vessel, or in other solid surfaces such as a heat exchanger.

Adding 0.1 to 100 micron islands of hydrophilic materials to the surfaces in the device would provide the same effect. For example, 0.1-100 micron drops of a PTFE solution sprayed onto the vessel walls would create islands of PTFE that are 0.1-100 microns in diameter. Islands of at least one of polyethylene, polypropylene, polystyrene, polyvinylchloride, polydimethylsiloxane, polyvinylpyridine, polybutadiene, polyisoprene, and polyvinylidenefluoride should all be equivalently effective. Rahmani (https://www.researchgate.net/publication/337938221_List_of_Hydrophobic_Polymers_and_Coating) provides a longer list of hydrophobic polymers. Each of these hydrophobic polymers could be used to produce islands that enhance nucleation of $CO_2$ bubbles.

Specific Examples 1 and 2 considered a single tertiary amine (DEEA), but the nucleation process is not dependent on the amine. Instead, any solution comprising an amine would be expected to provide a similar enhancement. The tertiary amines, N-methyldiethanolamine (MDEA), 2-(dimethylamino)ethanol (DMAE), N-tert-butyldiethanolamine (tBDEA), 3-dimethylamino-1-propanol (DMA-1P), 3-(dimethylamino)-1,2-propanediol (DMA-1,2-PD), 2-diethylethanoamine (DEEA), 3-diethylamino-1,2-propanediol (DEA-1,2-PD), 3-diethylamino-1-propanol (DEA-1P), triethanolamine (TEA), 1-dimethylamino-2-propanol (DMA-2P), 1-(2-hydroxyethyl)pyrrolidine (1-(2HE)PRLD), 1-diethylamino-2-propanol (DEA-2P), 3-pyrrolidino-1,2-propanediol (PRLD-1,2-PD), 2-(diisopropylamino)ethanol (DIPAE), 1-(2-hydroxyethyl)piperidine (1-(2HE)PP), 2-(dimethylamino)-2-methyl-1-propanol (DMA-2M-1P), 3-piperidino-1,2-propanediol (3PP-1,2-PD), 3-dimethylamino-2,2-dimethyl-1-propanol (DMA-2,2-DM-1P), 3-hydroxy-1-methylpiperidine (3H-1MPP), N-ethyldiethanolamine (EDEA), 1-ethyl-3-hydroxypiperidine (1E-3HPP), 4-ethyl-methyl-amino-2-butanol (4EMA-2B), N-isopropyldiethanolamine (IPDEA), and 1-methyl-2-piperidineethanol (1M-2PPE) are particularly favored. The solution can also comprise other amines such as piperazine (PZ), N-methyl-1,3-propane-diamine (MAPA), monoethanolamine (MEA), and diethanolamine (DEA).

The examples given above are illustrative and are not meant to be an exhaustive list of all possible embodiments, applications or modifications of the invention. Thus, various modifications and variations of the described methods and systems of the invention will be apparent to those skilled in the art without departing from the scope of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

The disclosures of all references and publications cited above are expressly incorporated by reference in their entireties to the same extent as if each were incorporated by reference individually.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A system for capturing and concentrating $CO_2$ comprising:
   a capture unit capable of adsorbing or absorbing $CO_2$ into a fluid stream;
   a stripping unit capable of removing $CO_2$ from said fluid stream;
   wherein the system comprises at least one of the following:
   (a) solid particles within said fluid stream comprising at least one of:
      (i) pores with a diameter between 0.1 and 100 microns;
      (ii) crevices with a minimum opening width between 0.1 and 100 microns;
      (iii) cracks with a minimum opening between 0.1 and 100 microns;
   (b) solid particles within said stripping unit comprising at least one of:
      (i) pores with a diameter between 0.1 and 100 microns;
      (ii) crevices with a minimum opening width between 0.1 and 100 microns;
      (iii) cracks with a minimum opening between 0.1 and 100 microns;

(c) solid surfaces within said stripping unit comprising at least one of:
  (i) pores with a diameter between 0.1 and 100 microns;
  (ii) crevices with a minimum opening width between 0.1 and 100 microns;
  (iii) cracks with a minimum opening between 0.1 and 100 microns;
  (iv) islands of hydrophobic materials with a diameter between 0.1 and 100 microns,
wherein said particles comprise a hydrophobic polymer, and wherein said particles comprise calcium sulfate.

2. The system of claim 1, wherein at least one of said pores, cracks and crevices are hydrophobic.

3. The system of claim 1, wherein said hydrophobic polymer is at least one of polyethylene, polypropylene, polystyrene, polyvinylchloride, polydimethylsiloxane, polyvinylpyridine, polybutadiene, polyisoprene, polyvinylidenefluoride, and polytetrafluoroethylene.

4. The system of claim 1, wherein said particles comprise porous carbon.

5. The system of claim 1, wherein said fluid comprises an amine.

6. The system of claim 1, wherein said fluid comprises at least one of piperazine (PZ), N-methyl-1,3-propane-diamine (MAPA), monoethanolamine (MEA), and diethanolamine (DEA).

7. The system of claim 1, wherein said fluid is a liquid.

8. A system for capturing and concentrating $CO_2$ comprising:
  a capture unit capable of adsorbing or absorbing $CO_2$ into a fluid stream;
  a stripping unit capable of removing $CO_2$ from said fluid stream;
  wherein the system comprises at least one of the following:
    (a) solid particles within said fluid stream comprising at least one of:
      (i) pores with a diameter between 0.1 and 100 microns;
      (ii) crevices with a minimum opening width between 0.1 and 100 microns;
      (iii) cracks with a minimum opening between 0.1 and 100 microns;
    (b) solid particles within said stripping unit comprising at least one of:
      (i) pores with a diameter between 0.1 and 100 microns;
      (ii) crevices with a minimum opening width between 0.1 and 100 microns;
      (iii) cracks with a minimum opening between 0.1 and 100 microns;
    (c) solid surfaces within said stripping unit comprising at least one of:
      (i) pores with a diameter between 0.1 and 100 microns;
      (ii) crevices with a minimum opening width between 0.1 and 100 microns;
      (iii) cracks with a minimum opening between 0.1 and 100 microns;
      (iv) islands of hydrophobic materials with a diameter between 0.1 and 100 microns,
  wherein said fluid comprises an amine,
  wherein said fluid comprises at least one of N-methyldiethanolamine (MDEA), 2-(dimethylamino)ethanol (DMAE), N-tert-butyldiethanolamine (tBDEA), 3-dimethylamino-1-propanol (DMA-1P), 3-(dimethylamino)-1,2-propanediol (DMA-1,2-PD), 2-diethylethanolamine (DEEA), 3-diethylamino-1,2-propanediol (DEA-1,2-PD), 3-diethylamino-1-propanol (DEA-1P), triethanolamine (TEA), 1-dimethylamino-2-propanol (DMA-2P), 1-(2-hydroxyethyl)pyrrolidine (1-(2HE)PRLD), 1-diethylamino-2-propanol (DEA-2P), 3-pyrrolidino-1,2-propanediol (PRLD-1,2-PD), 2-(diisopropylamino)ethanol (DIPAE), 1-(2-hydroxyethyl)piperidine (1-(2HE)PP), 2-(dimethylamino)-2-methyl-1-propanol (DMA-2M-1P), 3-piperidino-1,2-propanediol (3PP-1,2-PD), 3-dimethylamino-2,2-dimethyl-1-propanol (DMA-2,2-DM-1P), 3-hydroxy-1-methylpiperidine (3H-1MPP), N-ethyldiethanolamine (EDEA), 1-ethyl-3-hydroxypiperidine (1E-3HPP), 4-ethyl-methyl-amino-2-butanol (4EMA-2B), N-isopropyldiethanolamine (IPDEA), and 1-methyl-2-piperidineethanol (1M-2PPE).

9. The system of claim 8, wherein at least one of said pores, cracks and crevices are hydrophobic.

10. The system of claim 8, wherein said amine is a tertiary amine.

11. The system of claim 8, wherein said fluid comprises DEEA.

12. The system of claim 8, wherein said fluid is a liquid.

13. The system of claim 8, wherein said islands comprise a hydrophobic polymer.

14. The system of claim 13, wherein said hydrophobic polymer comprises at least one of polyethylene, polypropylene, polystyrene, polyvinylchloride, polydimethylsiloxane, polyvinylpyridine, polybutadiene, polyisoprene, polyvinylidenefluoride, and polytetrafluoroethylene.

15. The system of claim 8, wherein said particles comprise a hydrophobic polymer.

16. The system of claim 15, wherein said hydrophobic polymer is at least one of polyethylene, polypropylene, polystyrene, polyvinylchloride, polydimethylsiloxane, polyvinylpyridine, polybutadiene, polyisoprene, polyvinylidenefluoride, and polytetrafluoroethylene.

17. The system of claim 15, wherein said particles comprise at least one of alumina, silicon carbide, calcium carbonate, calcium sulfate, porcelain, and carbon.

18. The system of claim 17, wherein said particles comprise calcium sulfate.

19. The system of claim 17, wherein said particles comprise porous carbon.

* * * * *